Oct. 29, 1963 B. A. FIERSTINE 3,108,830
BALL JOINT CONSTRUCTION AND METHOD OF ASSEMBLY THEREFOR
Filed July 13, 1960
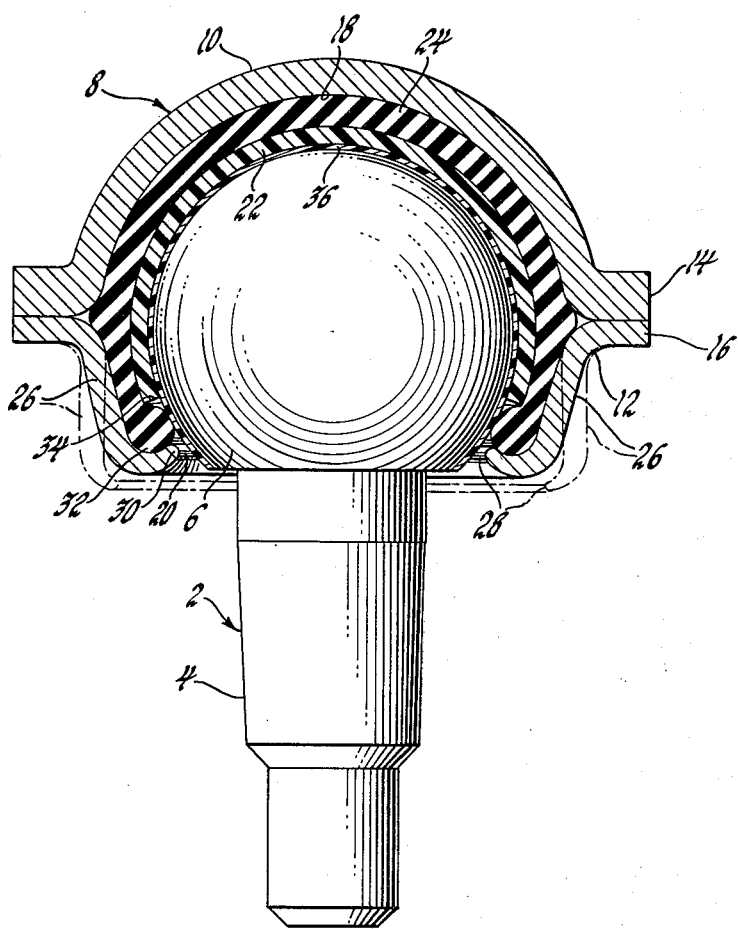
INVENTOR.
Burton A. Fierstine
BY
W. F. Wagner
ATTORNEY

United States Patent Office 3,108,830
Patented Oct. 29, 1963

3,108,830
BALL JOINT CONSTRUCTION AND METHOD
OF ASSEMBLY THEREFOR
Burton A. Fierstine, Saginaw, Mich., assignor to General
Motors Corporation, Detroit, Mich., a corporation of
Delaware
Filed July 13, 1960, Ser. No. 42,703
7 Claims. (Cl. 287—87)

This invention relates to swivel joints and more particularly to improvements in ball and socket joints of the type employed in vehicle suspension, steering linkage and the like.

An object of the present invention is to provide an improved ball joint construction.

A further object is to provide a ball joint construction utilizing an elastic layer effecting isolation between the ball and the bearing surface of the socket.

A still further object is to provide a construction of the stated character wherein the elastic layer includes a portion disposed so as to form a seal at the juncture between the cooperating ball and the socket bearing surface to prevent the entrance of dirt and other contaminants.

Yet a further object is to provide a joint comprising a stud having a ball head which is contained within a partispherical sheet metal socket, which socket contains a plastic bearing liner in intimate bearing contact with the ball head, the liner being isolated from the sheet metal socket by a semi-spherical rubber liner having a terminal circumferential lip which is biased into yieldable wiping engagement with the portion of the ball immediately externally adjacent the terminal edge of the bearing liner to form a wiping seal.

Yet a further object is to provide a structure of the stated character wherein the rubber liner is preloaded during the process of assembly of the joint so as to compensate for wear occurring between the plastic bearing liner and the ball head.

Still a further object is to provide a structure of the stated character wherein the ball head is formed with a bonded or sintered low friction skin formed of material such as Teflon.

These and other objects, advantages and features of the invention will become more fully apparent as reference is had to the accompanying specification and drawing.

In the drawing, the reference numeral 2 designates a unitary ball stud element which includes a depending stud portion 4 and a spherical or ball head portion 6. Spherical portion 6 is contained within a socket assembly 8 formed of an upper stamping 10 and a lower stamping 12. Stampings 10 and 12 are formed with abutting radial flanges 14 and 16, respectively, which are secured together by any suitable means, as for example, spot welding, to form a generally spherical internal cavity 18 having an open lower end 20 through which stud portion 4 extends. Contained within cavity 18 and lying in intimate bearing contact with ball head 6 is a molded semi-spherical plastic bearing element 22. Disposed between bearing element 22 and the inner wall of socket cavity 18 is a rubber liner element 24, which not only serves to locate and retain bearing element 22 in position, but also serves to reduce transmission of shock and noise from ball head 6 to socket 8.

In accordance with one feature of the invention, liner 24 in free form is dimensioned so as to establish a substantial preload on bearing element 22 when the ball and socket are in the assembled condition shown in the drawing, so as to compensate for a gradual wear occurring between the adjacent surfaces of ball 6 and bearing 22.

In order to accomplish assembly of the illustrated construction in accordance with the present invention, lower sheet metal stamping 12 is initially formed with a depending cylindrical wall portion 26 as shown in dotted lines. In its initial form, the mouth 28 at the lower extremity of wall portion 26 is of sufficient diameter to permit endwise insertion of liner 24, bearing element 22, and ball head 6. Following insertion of the indicated elements, a load is applied to stud 4 and cylindrical wall 26 is swaged spun radially inwardly to assume a generally conical form with the inturned circumferential terminal lip 30 thereof occupying a radially inward position preventing endwise separation of the socket, liner, bearing element and ball head. As an incidence of spinning cylindrical wall 26 inwardly while stud 4 is under load, preloading of rubber liner 24, previously referred to, is also accomplished.

In accordance with another feature of the invention, the spinning operation performed on cylindrical wall 26 causes the circumferential lip 32 of liner 24 to overlap the terminal end 34 of bearing element 22 and yieldably bear against the outer surface of ball head 6 so as to form a resilient seal preventing entrance of dirt and other contaminants between the cooperating bearing surfaces of bearing element 22 and ball 6.

In accordance with a further feature of the invention, ball head 18 has applied thereto a relatively thin layer 36 of extremely low friction material, such as Teflon. Layer 36 may take the form of either a woven material bonded to the ball or a continuous deposit applied, as for example, by sintering. It will be apparent that the presence of the low friction material extending to the lower limits of the spherical portion of ball head 6 will not only eliminate any need for conventional lubrication between the ball 6 and bearing element 22, but in addition will prevent any tendency for the lip seal 32 to abrade as a result of articulation of the ball relative to the socket. As a result, an efficient and effective dirt seal is accomplished while the need for a bulky boot or cover around the stud portion 4 is totally eliminated, thereby simplifying the overall construction and reducing the overall length requirement of the assembly.

While but one embodiment of the invention has been shown and described, it will be apparent that other changes and modifications may be made therein. It is, therefore, to be understood that it is not intended to limit the invention to the embodiment shown, but only by the scope of the claims which follow.

What is claimed is:

1. A joint assembly comprising a socket having an opening at one end thereof, a stud having a head portion in said socket, a plastic bearing member in said socket engaging said head portion, an elastomeric liner disposed between said bearing member and said socket and confined entirely within the latter, and means on said liner extending beyond said bearing member and projecting radially inwardly for wiping engagement with said head portion to form a seal at the juncture of the bearing member and head portion.

2. A joint assembly comprising a socket having an opening at one end thereof, a stud having a spherical head portion in said socket, a layer of low friction material secured to said head portion, a plastic bearing member in said socket engaging said head portion, an elastomeric liner contained entirely within said socket and disposed between said bearing member and said socket, and means on said liner extending beyond said bearing member and projecting radially inwardly into wiping engagement with said head portion to form a seal at the juncture of the bearing member and head portion.

3. The structure set forth in claim 2 wherein said layer of low friction material is formed of Teflon.

4. The structure set forth in claim 3 wherein said Teflon is bonded to said head portion.

5. A joint assembly comprising a generally spherical socket having an opening at one end thereof, a stud having a spherical head portion disposed in said socket, a semi-spherical plastic bearing member in said socket engaging said head portion, a semi-spherical elastomeric liner contained entirely within said socket disposed between said bearing member and said socket, and means on said liner extending beyond said bearing member and projecting radially inwardly into wiping engagement with said head portion to form a seal at the juncture of the bearing member and head portion permitting both rotating and rocking movement of said stud relative to said socket.

6. A ball joint assembly comprising a socket formed of a flanged upper semi-spherical shell and an abutting flanged lower shell having an opening therein bounded by an inwardly and upwardly curved circumferential lip, a stud extending upwardly through said opening having a ball head disposed internally of said socket, a semi-spherical plastic bearing member surroundingly engaging said ball head, a rubber liner contained entirely within said socket disposed in compression between said socket and bearing member, said liner terminating in a circumferential lip extending beyond the open end of said bearing member biased into wiping engagement with said ball head by said circumferential lip on said lower shell.

7. A ball joint assembly comprising a socket formed of abutting sheet metal shells, the upper of said shells having a semi-spherical cavity formed therein and the lower of said shells having a cylindrical portion formed with an inturned lip defining an opening, a stud extending upwardly through said opening having a Teflon clad ball head disposed internally of said socket, a semi-spherical plastic bearing member surroundingly engaging said ball head, a rubber liner disposed in compression between said socket and bearing member, said liner having a circumferential lip which extends beyond the open end of said bearing member and terminates within said socket, said lip being biased radially inwardly by the inturned lip of said lower shells into wiping engagement with the portion of said ball head immediately outwardly adjacent the open end of said bearing member.

References Cited in the file of this patent

UNITED STATES PATENTS

| | | |
|---|---|---|
| 2,096,557 | Peo | Oct. 19, 1937 |
| 2,809,130 | Rappaport | Oct. 8, 1957 |
| 2,912,267 | Latzen | Nov. 10, 1959 |
| 2,976,068 | Jordan | Mar. 21, 1961 |

FOREIGN PATENTS

| | | |
|---|---|---|
| 418,801 | Great Britain | Oct. 31, 1934 |